(12) United States Patent
Purohit et al.

(10) Patent No.: US 11,381,470 B2
(45) Date of Patent: Jul. 5, 2022

(54) HYPERPARAMETER MANAGEMENT DEVICE, HYPERPARAMETER MANAGEMENT SYSTEM, AND HYPERPARAMETER MANAGEMENT METHOD

(71) Applicant: Hitachi, Ltd., Tokyo (JP)

(72) Inventors: Harsh Pramodbhai Purohit, Tokyo (JP); Takashi Endo, Tokyo (JP); Yohei Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 304 days.

(21) Appl. No.: 16/812,415

(22) Filed: Mar. 9, 2020

(65) Prior Publication Data

US 2020/0389364 A1 Dec. 10, 2020

(30) Foreign Application Priority Data

Jun. 7, 2019 (JP) .............................. JP2019-106758

(51) Int. Cl.
*H04L 41/16* (2022.01)
*G06N 20/10* (2019.01)
*G06K 9/62* (2022.01)

(52) U.S. Cl.
CPC ............ *H04L 41/16* (2013.01); *G06K 9/6226* (2013.01); *G06K 9/6277* (2013.01); *G06N 20/10* (2019.01)

(58) Field of Classification Search
CPC ...... H04L 41/16; G06N 20/10; G06K 9/6226; G06K 9/6277
See application file for complete search history.

(56) References Cited

U.S. PATENT DOCUMENTS

| | | | |
|---|---|---|---|
| 2018/0240010 A1* | 8/2018 | Faivishevsky | G06N 3/0454 |
| 2019/0095798 A1* | 3/2019 | Baker | G06N 3/063 |
| 2019/0370684 A1* | 12/2019 | Gunes | G06N 20/00 |
| 2020/0202170 A1* | 6/2020 | Basu | G06N 7/005 |

OTHER PUBLICATIONS

Ville Satop et al., Finding a "Kneedle" in a Haystack: Detecting Knee Points in System Behavior, 166-171. In 31-st International Conference on Distributed Computing System, 2011.

\* cited by examiner

*Primary Examiner* — Tonia L Dollinger
*Assistant Examiner* — Jihad K Boustany
(74) *Attorney, Agent, or Firm* — Mattingly & Malur, PC

(57) ABSTRACT

The hyperparameter management device of the present invention includes a compression network to dimensionally compress data to produce a low dimensional representation, an estimation network to estimate a density distribution of the low dimensional representation and a hyperparameter calculation unit to calculate hyperparameters for the compression network and the estimation network, wherein the hyperparameter calculation unit calculates, based on a set of subject data and a set of uniform data, a gap statistic using a gap statistic calculation technique, and calculates, using a curve fitting technique, an estimation network hyperparameter based on at least the gap statistic, calculates a ratio of variance of principal components of the set of subject data, and calculates, using a curve fitting technique, a compression network hyperparameter based on at least the ratio of variance, and sets the estimation network hyperparameter in the estimation network and sets the compression network hyperparameter in the compression network.

6 Claims, 16 Drawing Sheets

200

1500

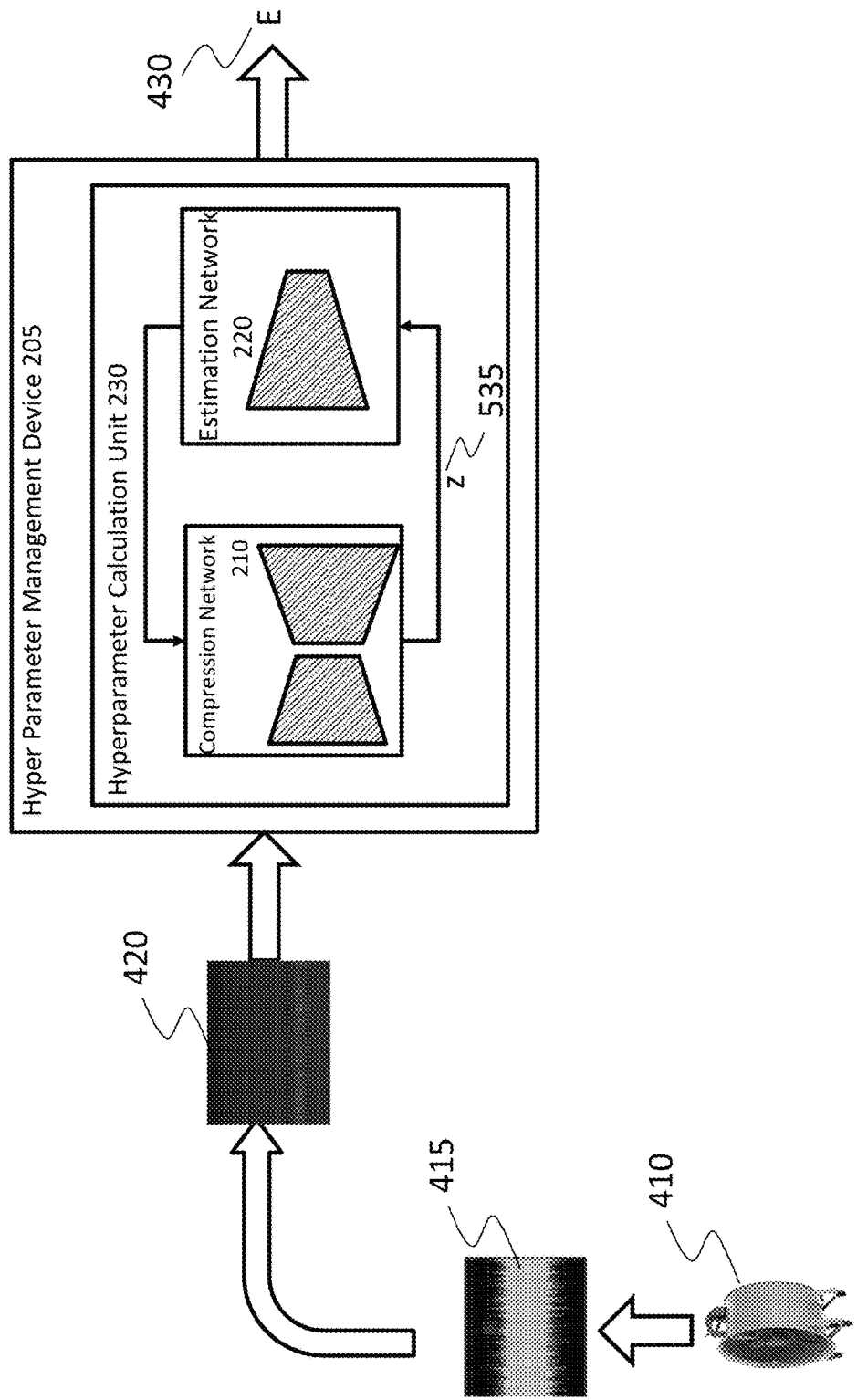

HYPERPARAMETER MANAGEMENT DEVICE, HYPERPARAMETER MANAGEMENT SYSTEM, AND HYPERPARAMETER MANAGEMENT METHOD

CROSS-REFERENCE TO RELATED APPLICATIONS

The present application claims priority to Japanese Patent Application No. 2019-106758, filed Jun. 7, 2019. The contents of this application are incorporated herein by reference in their entirety.

TECHNICAL FIELD

The present invention relates to a hyperparameter management device, a hyperparameter management system, and a hyperparameter management method.

BACKGROUND OF THE INVENTION

Machine learning technology is attracting attention as a technique for creating new social value with respect to the analysis of data accumulated in various fields such as healthcare, finance, and industry. Machine learning refers to types of algorithms such as support vector machines and deep learning, as well as those parameters required to determine the models in each respective algorithm. These parameters, which are preset and control the behavior of the model, are referred to as "hyperparameters."

In general, there are tens of thousands or more combinations of such hyperparameters. Accordingly, when machine learning is applied to a problem to be analyzed, it is necessary to try a number of combinations of hyperparameters and identify the combinations that lead to the highest accuracy. In addition, since the optimum combination of hyperparameters differs depending on the problem to be analyzed, it is necessary to investigate combinations of hyperparameters each time the problem or the data changes, which is a problem that arises when utilizing machine learning techniques.

CITATION LIST

Patent Literature

[Non-Patent Document 1] Satopaa, V., Albrecht, J., Irwin, D. and Raghavan, B., 2011. Finding a 'kneedle' in a haystack: Detecting knee points in system behavior. 166-171. In 31-st International Conference on Distributed Computing Systems.

SUMMARY OF INVENTION

Technical Problem

The above-mentioned Non-Patent Document 1 describes a means for identifying hyperparameters. However, the means described in the above-mentioned non-patent document requires a large amount of labeled data to train machine learning models. Accordingly, in order to implement the means described in the non-patent literature, cost and man-hours are required in order to identify the hyperparameters.

It is therefore an object of the present invention to provide a machine learning model that can be applied to fields such as abnormality detection and predictive maintenance at a low cost by identifying hyperparameters using an unsupervised learning technique.

Solution to Problem

In order to solve the above problems, one representative hyperparameter management device according to the present invention includes a compression network configured to dimensionally compress data to produce a low dimensional representation, an estimation network configured to estimate a density distribution of the low dimensional representation, and a hyperparameter calculation unit configured to calculate hyperparameters for the compression network and the estimation network, wherein the hyperparameter calculation unit is configured to calculate, based on a set of subject data and a set of uniform data, a gap statistic using a gap statistic calculation technique, and calculate, using a curve fitting technique, an estimation network hyperparameter based on at least the gap statistic, calculate a ratio of variance of principal components of the set of subject data, and calculate, using a curve fitting technique, a compression network hyperparameter based on at least the ratio of variance, and set the estimation network hyperparameter in the estimation network and set the compression network hyperparameter in the compression network.

Advantageous Effects of Invention

According to the present invention, it is possible to provide a machine learning model that can be applied to fields such as abnormality detection and predictive maintenance at low cost by identifying hyperparameters using an unsupervised learning technique.

Problems, configurations, and effects other than those described above will become apparent from the following explanation in the detailed description.

BRIEF DESCRIPTION OF DRAWINGS

FIG. 16 is a diagram illustrating an example of a configuration for independently using the estimation network and the compression network according to an embodiment of the present invention.

DESCRIPTION OF EMBODIMENTS

Figure 1:
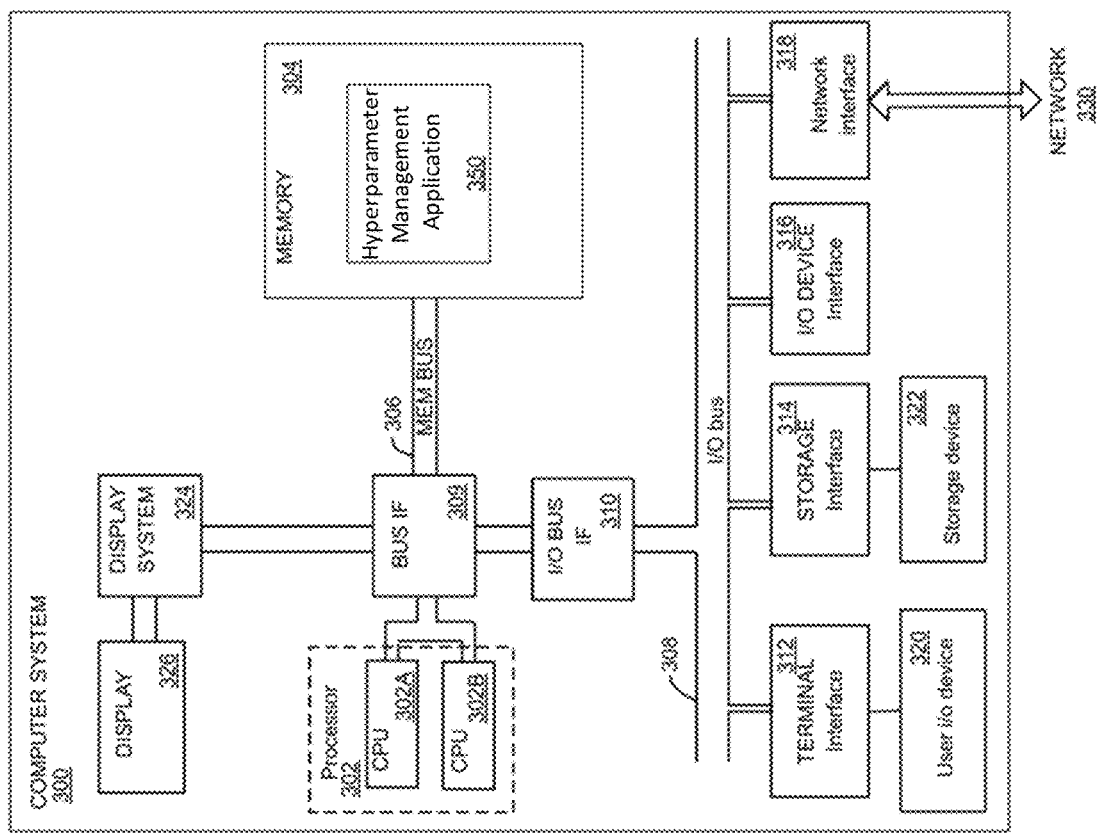
FIG. 1 is a block diagram of a computer system for implementing embodiments of the present invention.

Hereinafter, an existing example and an embodiment of the present invention will be described with reference to the drawings. It should be noted that the present invention is not limited to these embodiments. In the description of the drawings, the same portions are denoted by the same reference numerals.

(Overview)

As mentioned above, the present invention relates to the optimization of hyperparameters. Here, hyperparameters refer to parameters for controlling the behavior of machine learning algorithms. Hyperparameters include those that define various characteristics in the machine learning algorithm, such as, for example, learning rates, batch sizes, the number of learning iterations, and the like.

When machine learning is applied to a problem to be analyzed, it is desirable to optimize the hyperparameters of the model in order to construct a machine learning model that can solve the problem as efficiently as possible. However, since mutual relationships may exist between the hyperparameters of the machine learning model, trade-offs can occur in which the efficiency of one hyper-parameter must be sacrificed in order to pursue the optimization of another hyperparameter. Accordingly, it is difficult to improve the accuracy and efficiency of the entire system only by optimizing the hyperparameters one by one.

For this reason, conventionally, when a machine learning model is applied to a field such as abnormality detection, predictive maintenance, or the like, it is necessary to obtain labeled training data for machine learning training, and then try a number of combinations of hyperparameters to identify the combinations with the highest accuracy.

In view of the above problems, in the present embodiments, in order to realize a machine learning model effective for abnormality detection, predictive maintenance, and the like, the hyperparameters of the machine learning model are identified by using an unsupervised learning technique for which labeled data is unnecessary. Specifically, the machine learning model in the present embodiment includes a compression network that compresses a set of subject data and generates a subject data low dimensional representation, and an estimation network that estimates the density distribution of the low dimensional representation. By analyzing the density distribution, it is possible to determine whether the device that generated the set of subject data, such as a cooling fan, is normal or abnormal.

In order to improve the accuracy of the abnormality detection of the machine learning model, it is necessary to optimize hyperparameters such as the number of dimensions of the low dimensional representation generated by the compression network and the number of Gaussian distributions necessary to approximate specific data in the estimation network. Accordingly, the present invention relates to calculating the number of dimensions of a low dimensional representation, which serves as a hyperparameter of the compression network, and the number of Gaussian distributions, which serves as a hyperparameter of the estimation network. Details of the method of calculating these hyperparameters will be described below.

(Hardware Configuration)

Referring first to FIG. 1, a computer system 300 for implementing embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

Computer system 300 may include one or more general purpose programmable central processing units (CPUs) 302A and 302B, herein collectively referred to as the processor 302. In some embodiments, the computer system 300 may include multiple processors, and in other embodiments, the computer system 300 may be a single CPU system. Each processor 302 executes instructions stored in the memory 304 and may include an on-board cache.

In some embodiments, the memory 304 may include random access semiconductor memory, storage devices, or storage media (either volatile or nonvolatile) for storing data and programs. The memory 304 may store all or part of the programs, modules, and data structures that perform the functions described herein. For example, the memory 304 may store a hyperparameter management application 350. In some embodiments, the hyperparameter management application 350 may include instructions or statements that execute on the processor 302 to carry out the functions described below.

In some embodiments, the hyperparameter management application 350 may be implemented in hardware via semiconductor devices, chips, logic gates, circuits, circuit cards, and/or other physical hardware devices in lieu of, or in addition to, processor-based systems. In some embodiments, the hyperparameter management application 350 may include data in addition to instructions or statements. In some embodiments, a camera, sensor, or other data input device (not illustrated) may be provided to communicate directly with the bus interface unit 309, the processor 302, or other hardware of the computer system 300.

Computer system 300 may include a bus interface unit 309 to handle communications among the processor 302, the memory 304, the display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, which are also known as I/O processors (IOPs) or I/O adapters (IOAs), via the I/O bus 308.

The display system 324 may include a display controller, a display memory, or both. The display controller may provide video, audio, or both types of data to the display device 326. The computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, exercise data, and the like. Other types of sensors may also be used. The display system 324 may be connected to a display device 326, such as a single display screen, a television, a tablet, or a portable device.

The I/O interface unit is capable of communicating with a variety of storage and I/O devices. For example, the terminal interface unit 312 may support the attachment of one or more user I/O devices 320, which may include user output devices such as video display devices, speakers, and televisions, or user input devices, which may include a keyboard, mouse, keypad, touchpad, trackball, buttons, light pens, or other pointing devices. A user may manipulate the user input devices using a user interface in order to provide input data and commands to the user I/O device 320 and the computer system 300 and may receive output data from the computer system 300. For example, the user interface may be displayed on a display device, played via a speaker, or printed via a printer via the user I/O device 320.

The storage interface 314 supports the attachment of one or more disk drives or direct access storage devices 322 (which are typically magnetic disk drive storage devices, although they could also be an array of disk drives or other storage devices configured to appear as a single disk drive). In some embodiments, the storage device 322 may be implemented via any type of secondary storage device. The contents of the memory 304 may be stored in the storage device 322 and read from the storage device 322 as necessary. The I/O device interface 316 may provide an interface to other I/O devices such as printers, fax machines, or the like. The network interface 318 may provide a communication path for the computer system 300 and other devices to communicate with each other. This communication path may be, for example, the network 330.

In some embodiments, the computer system 300 may be a device that receives requests from other computer systems (clients) that do not have a direct user interface, such as a multi-user mainframe computer system, a single-user system, or a server computer. In other embodiments, the computer system 300 may be a desktop computer, a portable computer, a notebook computer, a tablet computer, a pocket computer, a telephone, a smartphone, or any other suitable electronic device.

Next, the configuration of the hyperparameter management system according to the present embodiment will be described with reference to FIG. 2.

Figure 2:
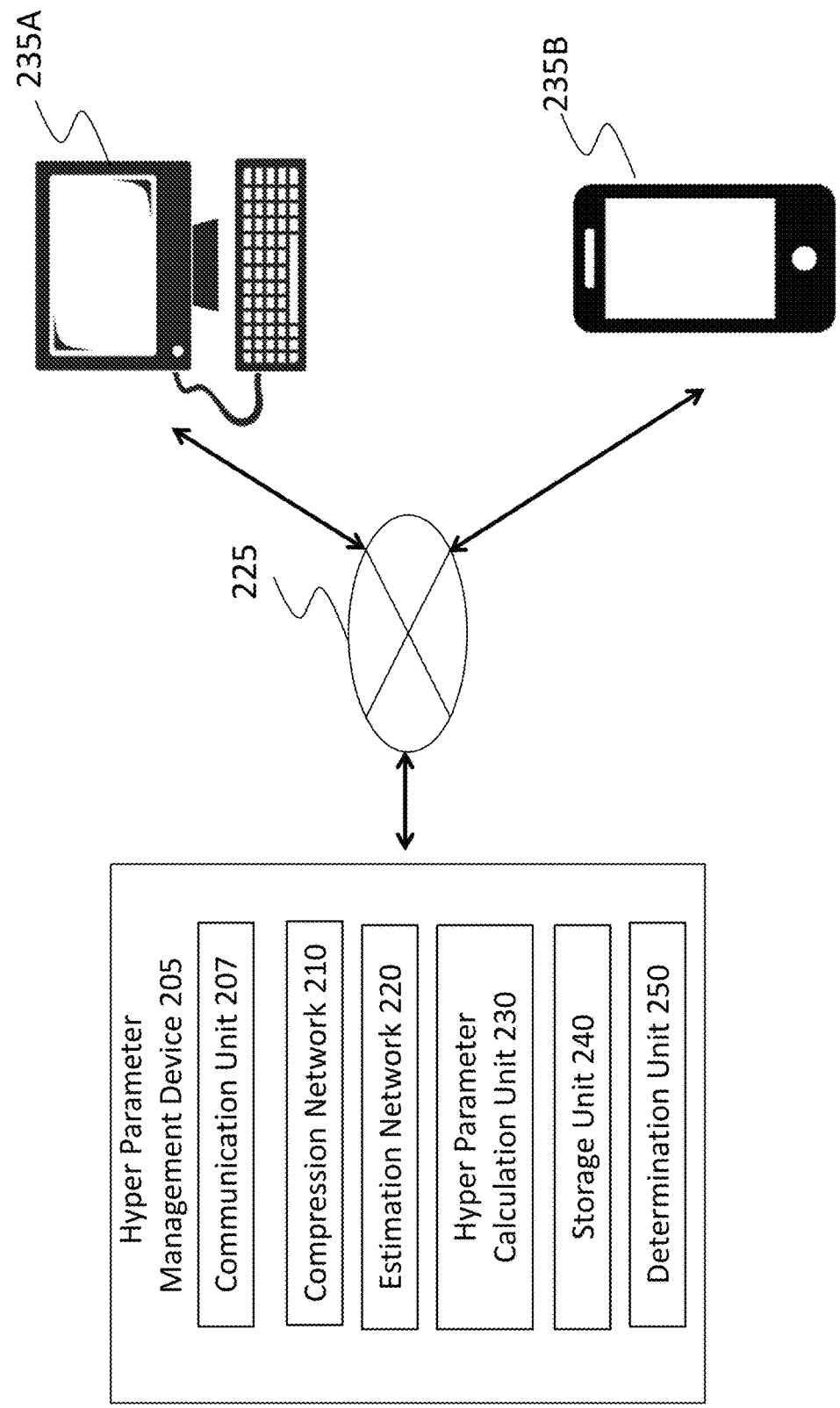
FIG. 2 is a block diagram illustrating an example of a configuration of a hyperparameter management system according to the present invention.

FIG. 2 is a diagram illustrating a configuration of a hyperparameter management system 200 according to the present embodiment. The hyperparameter management system 200 is a system for identifying hyperparameters in a machine learning model that can be applied to fields such as abnormality detection and predictive maintenance. Hereinafter, the configuration of the hyperparameter management system 200 will be described.

As illustrated in FIG. 2, the hyperparameter management system 200 includes a hyperparameter management device 205, a network 225, and client terminals 235A and 235B. The hyperparameter management device 205 is connected to the client terminals 235A and 235B via the network 225.

The hyperparameter management device 205 includes a communication unit 207 configured to perform data transmission and reception with the client terminals 235A and 235B, a compression network 210 configured to compresses the dimensions of a set of subject data and generate a low dimensional representation, an estimation network 220 configured to estimates the density distribution of the low dimensional representation, a hyperparameter calculation unit 230 configured to calculate hyperparameters for the compression network 210 and the estimation network 220, a storage unit 240 configured to store various information, and a determination unit 250 configured to determine a specificity of set of subject data.

Each functional unit included in the hyperparameter management device 205 may be a software module constituting the hyperparameter management application 350 illustrated in FIG. 1, or may be an independent dedicated hardware device. In addition, the above-described functional units may be implemented in the same computing environment or may be implemented in a distributed computing environment. For example, the hyperparameter calculation unit 230 may be implemented in a remote server, and the other functional units may be implemented in local devices such as the client terminals 235A and 235B.

The client terminals 235A and 235B are terminals that transmit subject data to be analyzed to the hyperparameter management device 205 via the network 225. After the analysis (for example, abnormality detection or the like) by the hyperparameter management device 205 is completed, information indicating the result of the analysis is returned to the client terminals 235A and 235B. The client terminals 235A and 235B may be any device, such as a desktop personal computer, a notebook personal computer, a tablet, or a smart phone.

It should be noted that, in the above description, a configuration has been described in which the compression network 210 and the estimation network 220 are disposed in the hyperparameter management device 205, the set of subject data for analysis transmitted from the client terminals 235A and 235B is analyzed, and information indicating the result of the analysis is returned; however, the present invention is not limited thereto, and a configuration in which the compression network 210 and the estimation network 220 are disposed in other servers or the client terminals 235A and 235B is also possible. In this case, the information generated by the compression network 210 and the estimation network 220 (the low dimensional representation and density distribution) may be transmitted to the hyperparameter management device 205, and the hyperparameter calculation unit 230 may calculate the hyperparameters based on the information and return the calculated hyperparameters.

Next, a functional configuration for training the hyperparameter management device according to an embodiment of the present invention will be described with reference to FIG. 3.

Figure 3:
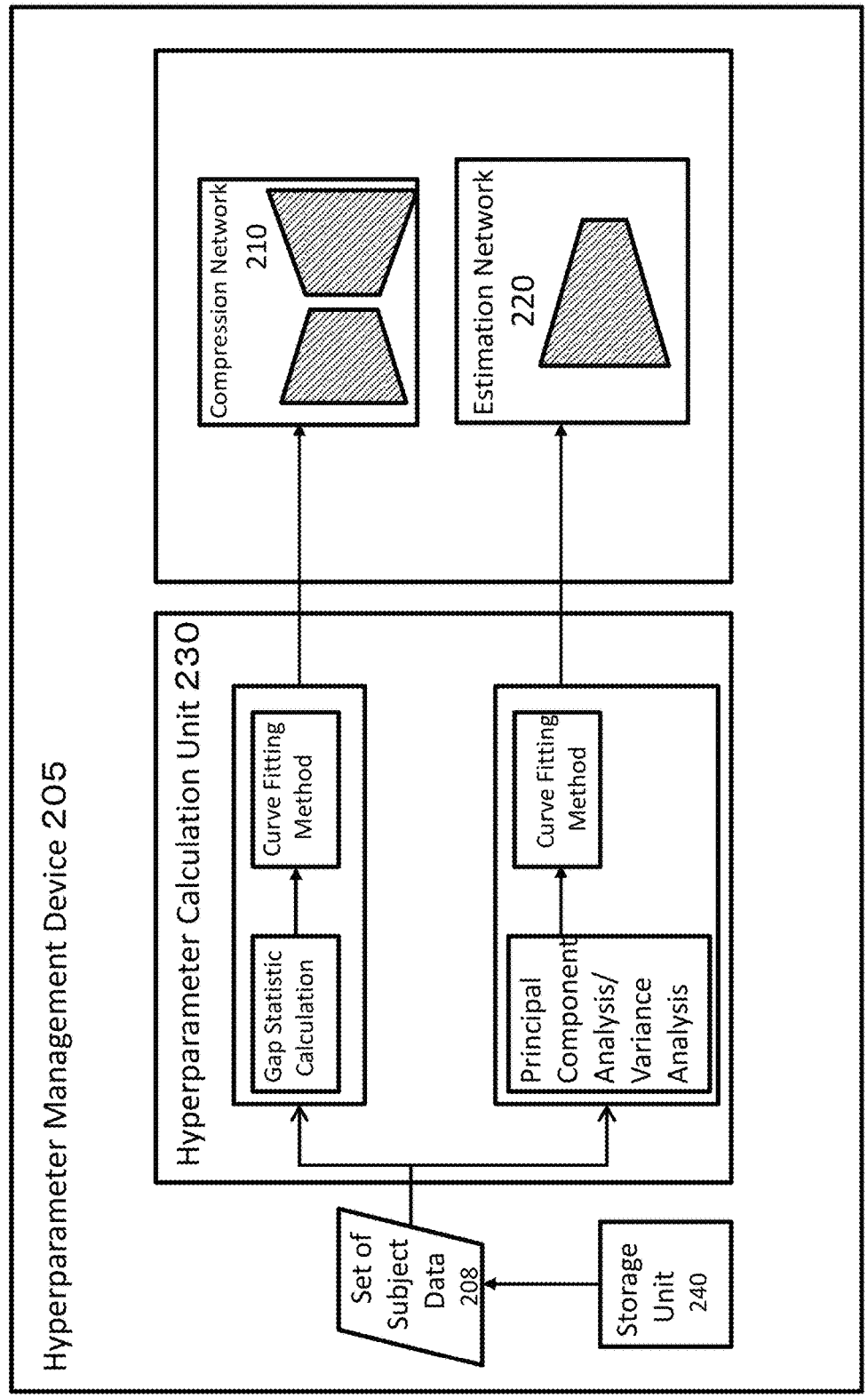
FIG. 3 is a diagram illustrating a functional configuration of a hyperparameter management device according to an embodiment of the present invention.

FIG. 3 is a diagram illustrating a functional configuration of the hyperparameter management device 205 according to an embodiment of the present invention. Such a configuration may be used, for example, for training the hyperparameter management device 205 (that is, for identifying appropriate hyperparameters).

First, the hyperparameter calculation unit 230 receives a set of subject data 208 (for training) from the storage unit 240. The set of subject data 208 may be, for example, data indicating a signal to be analyzed for abnormality detection. As an example, the set of subject data 208 may be a spectrogram (for example, a Log-Mel Spectrogram) representing the three dimensions of time, frequency, and intensity of signal components as a result of computing a frequency spectrum by passing a complex signal through a windowing function.

It should be noted that although FIG. 3 illustrates an example in which the set of subject data 208 for training is stored in advance in the storage unit, the present invention is not limited to this, and, for example, data received from the above-described client terminals can also be used.

The hyperparameter calculation unit 230 that has received the set of subject data 208 simultaneously executes a process of calculating a compression network hyperparameter for the compression network 210 and a process of calculating an estimation network hyperparameter for the estimation network 220 with respect to the set of subject data 208. As described above, these hyperparameters are parameters that define the characteristics of the compression network 210 and the estimation network 220 in order to accurately determine the specificity of a set of subject data.

Specifically, in order to calculate the compression network hyperparameter, the hyperparameter calculation unit 230 calculates the principal components and the ratio of variance of the set of subject data 208, and calculates the compression network hyperparameter based on the principal components and the ratio of variance using a curve fitting method. The compression network parameters are set in the compression network 210. The details of this calculation will be described later.

In addition, in order to calculate the estimation network hyperparameter, the hyperparameter calculation unit 230 calculates, based on the set of subject data 208 and a set of uniform data that indicates a uniform distribution, the gap statistic of the set of subject data 208 and the set of uniform data by using a the gap statistic calculation method.

Subsequently, the hyperparameter calculation unit 230 calculates the estimation network hyperparameter based on the gap statistic by using a curve fitting method. This estimation network hyperparameter is set in the estimation network 220. The details of this calculation will be described later.

As a result, it is possible to improve the accuracy of determining the specificity of the set of subject data in the compression network 210 and the estimation network.

Next, a configuration of a test environment of the hyperparameter management device according to an embodiment of the present invention will be described with reference to FIG. 4.

Figure 4:
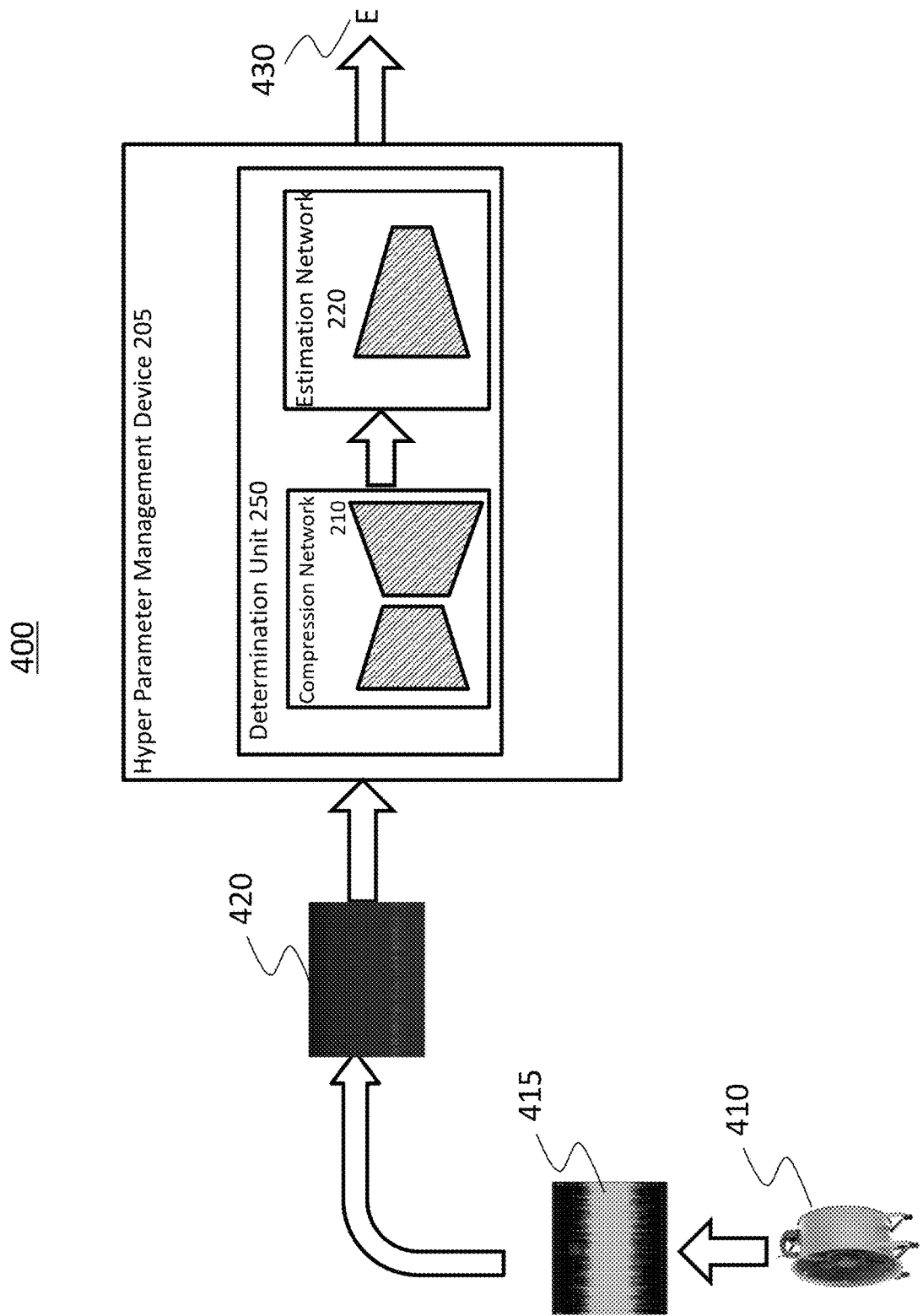
FIG. 4 is a block diagram illustrating a configuration of a test environment of the hyperparameter management device according to an embodiment of the present invention.

FIG. 4 is a diagram illustrating a configuration of a test environment 400 of the hyperparameter management device 205 according to an embodiment of the present invention.

It should be noted that, here, it is assumed that the compression network 210 and the estimation network 220 have already been trained (that is, that the appropriate compression network hyperparameters and estimation network hyperparameters have already been specified and set by the means described above).

As illustrated in FIG. 4, the test environment 400 includes a device 410 which serves as the source of the data to be analyzed, and a hyperparameter management device 205.

It should be noted that the configuration of the test environment 400 illustrated in FIG. 4 may be used to determine the specificity of the set of subject data using the trained compression network 210 and the estimation network 220. Here, specificity refers to a measure that indicates whether or not the data generated by a device to be verified is valid in view of the nature of the device. Based on this specificity, it can be determined whether the device 410 is operating normally or whether an abnormality has appeared. Hereinafter, for convenience of description, the expression "determining the specificity" means "verifying whether or not the device that generated the set of subject data is normal."

First, the set of subject data 415 to be analyzed is collected from the device 410 and converted into a spectrogram 420 (for example, a Log-Mel Spectrogram) that can be interpreted by the hyperparameter manager 205. As an example, the device 410 may be a cooling fan of a computing device located, for example, in a factory or a data center, and the data to be analyzed may be an audio signal representing the noise from the fan. The transformed spectrogram 420 is then input to the hyperparameter management device 205.

The determination unit 250 of the hyperparameter managing device 205 that has received the spectrogram 420 that serves as the set of subject data calculates the spectral density E (Energy Spectral Density) 430 of the spectrogram 420 using the trained compression network 210 and the estimation network 220. Here, the energy spectral density refers to a function that indicates how the energy of the signal or time series of the spectrogram 420, which serves as the set of subject data, is distributed with respect to the frequency.

By analyzing the energy spectral density, it can be determined whether the energy spectral density is valid (that is, the specificity of the data) 415 in view of the nature of the device 410 being verified. In this way, it is possible to determine whether the device 210 is operating normally or whether an abnormality has appeared. This result may be used, for example, for abnormality detection and predictive maintenance purposes.

Next, a compression network according to an embodiment of the present invention will be described with reference to FIG. 5.

Figure 5:
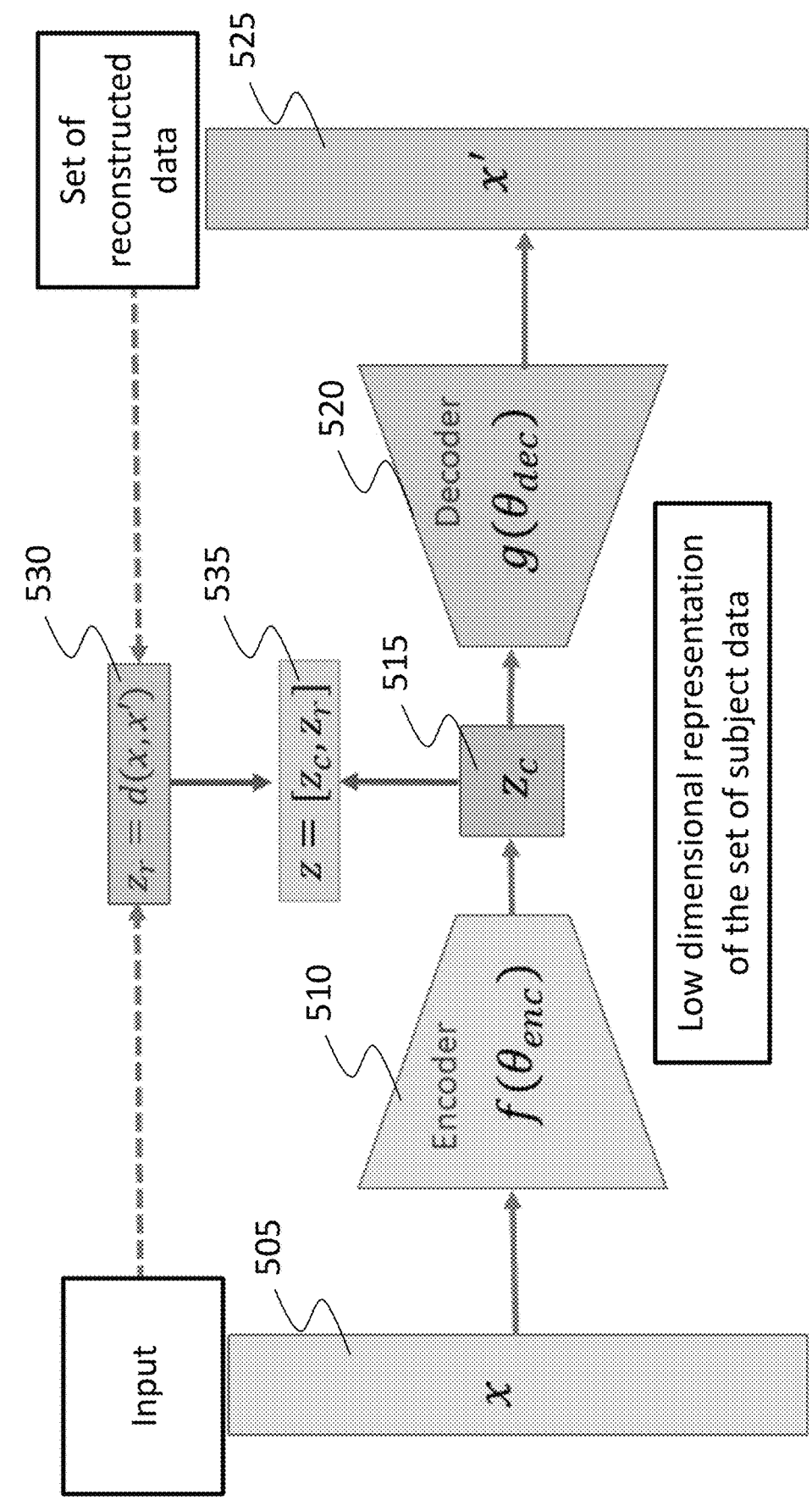
FIG. 5 is a diagram illustrating a configuration of a compression network according to an embodiment of the present invention.

FIG. 5 is a diagram illustrating a compression network 210 according to an embodiment of the present invention. As described above, the compression network 210 illustrated in FIG. 5 is a network for dimensionally compressing a set of subject data to generate a low dimensional representation. The compression network 210 may be, by way of example, what is known as an autoencoder network.

As illustrated in FIG. 5, the compression network 210 primarily includes an encoder 510 and a decoder 520.

The encoder 510 receives a set of subject data 505 (for example, the spectrogram 420 illustrated in FIG. 4) as an input, dimensionally compresses the set of subject data, and generates a low dimensional representation 515 ($z_c$). Here, the dimension of information refers to the number of variables for representing features in certain information. In principle, the higher the dimension of the information, the more granularly the characteristics of the information can be represented. The low dimensional representation 515 represents the set of subject data 505 in a lesser number of dimensions than the original. By compressing the set of subject data 505 into the low dimensional representation, it is possible to reduce the required capacity for storing the data while maintaining the meaning of the original data.

In addition, by adjusting the compression ratio of the encoder 510, the degree of compression of the set of subject data 505 can be set. In principle, the higher the compression ratio, the lower the dimensionality of the data, such that the required storage capacity is reduced; however, as will be described later, the accuracy of determining the specificity of the set of subject data is reduced. The "number of dimensions of the low dimensional representation" here is one of the hyperparameters of the compression network 210, and by calculating an appropriate number of dimensions by the method described later, it is possible to realize a machine learning model that is effective for abnormality detection and predictive maintenance.

As examples of specific methods for dimensional compression, Random Projection, Principal Component Analysis, Linear Discriminant Analysis, Isomap, Locally Linear Embedding, Modified Locally Linear Embedding, Hessian Locally Linear Embedding, Spectral Embedding, Local Tangent Space Alignment, Multi-dimensional Scaling, t-distributed Stochastic Neighbor Embedding, and Random Forest Embedding can be used.

The decoder 520 generates a set of reconstructed data 525 (x') obtained by reconstructing the set of subject data 505 based on the low dimensional representation 515 generated by the encoder 510. It should be noted that loss occurs when the set of reconstructed data 525 is generated based on the low dimensional representation 515. The lower the number of dimensions of the low dimensional representation 515, the greater the loss. By applying any suitable distance calculation method, such as Euclidean distance calculation, to the set of subject data 505 and the reconstructed data 525, the error 530 ($z_r$) of the set of reconstructed data 525 with respect to the set of subject data 505 can be calculated.

Next, a set of output data 535 ($z$), which includes the low dimensional representation 515 ($z_c$) and the error 530 of the set of reconstructed data 525 with respect to the set of subject data 505, becomes the input of the estimation network, which will be described later. The set of output data 535 may be processed by an estimation network to calculate a density distribution (for example, the energy spectral density) used to determine the specificity of the set of subject data 505.

Next, a configuration of the estimation network according to an embodiment of the present invention will be described with reference to FIG. 6.

Figure 6:
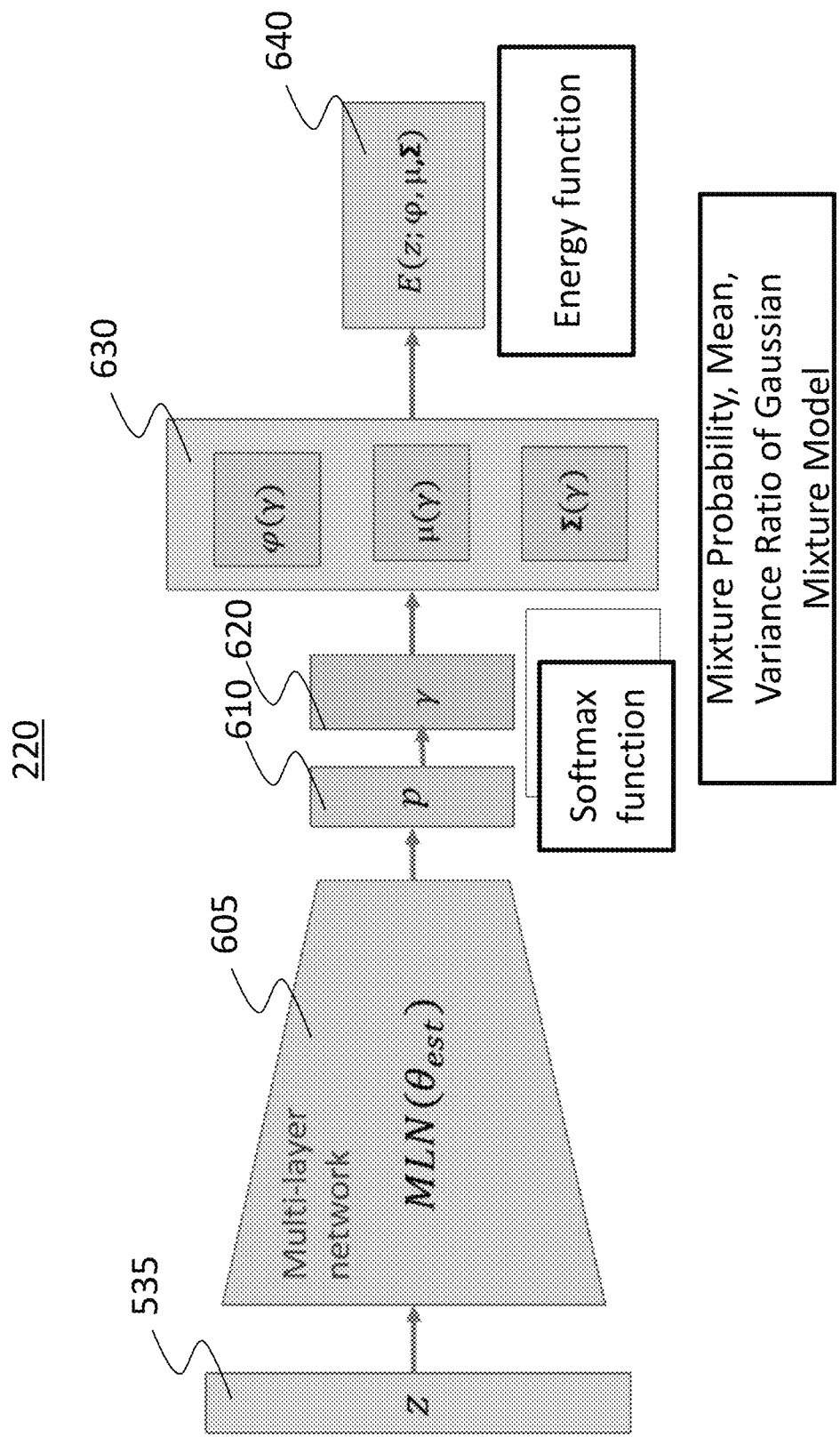
FIG. 6 is a diagram illustrating a configuration of an estimation network according to an embodiment of the present invention.

FIG. 6 is a diagram illustrating a configuration of the estimation network 220 according to an embodiment of the present invention. As described above, the estimation network 220 illustrated in FIG. 6 is a network that calculates the density distribution (for example, the energy spectral density) of a set of subject data based on the output data 535 ($z$) from the compression network.

As illustrated in FIG. 6, the estimation network 220 primarily comprises a multilayer network 605 and a computation layer 630.

First, the multilayer network 605 receives the set of output data 535 from the compression network 210, and performs a predetermined estimation operation on the set of output data 535 to calculate the probability 610 ($p$) that a particular data point belongs to a specific cluster. This probability 610 is then normalized with what is known as a softmax function. The softmax function is a function for receiving the input of a denormalized vector such as the probability 610, converting it into a probability distribution (that is, a distribution in which each component is a number greater or equal to 0 and less than or equal to 1, and the sum of the components is 1), and normalizing it.

Next, the computation layer 630 inputs the probability 610 normalized by the softmax function and the number of Gaussian distributions γ 620, which is a hyperparameter of the estimation network 220, and calculates the mixture probability, the mean, and the ratio of variance of the Gaussian mixture model. Here, a Gaussian mixture model refers to a model represented by a linear superposition of Gaussian distributions. Using a sufficient number of Gaussian distributions and adjusting the coefficients of a linear combination of weights, the mean of each distribution, and the covariance, a given continuous function can be approximated to any degree of accuracy.

The number of Gaussian distributions γ 620 required to approximate a given set of data is one of the hyperparameters of the estimation network 220. In an untrained estimation network, since the appropriate number of Gaussian distributions for approximating a given set of data is unknown, it is necessary to try a large number of parameters and estimate those parameters that lead to the highest accuracy. However, in the present embodiment, the number of Gaussian distributions γ 620 appropriate for a given set of data is calculated by the method described later, and is set in the estimation network 220 in advance, such that this trial and error becomes unnecessary, and a machine learning model effective for abnormality detection and predictive maintenance can be realized.

Next, the computation layer 630 calculates the energy spectral density 640 using the mixture probability, the mean, and the ratio of variance of the Gaussian mixture model of the output normalized by the softmax function. As described above, the energy spectral density 640 is a function that indicates how the energy of the signal or time series of the set of subject data are distributed with respect to the frequency. This energy spectral density function is shown by the following Equation 1:

$$E(z) = -\log\left(\sum_{k=1}^{K} \varphi_k \frac{\exp\left(-\frac{1}{2}(z-\mu_k)^T \Sigma_k^{-1}(z-\mu_k)\right)}{\sqrt{|2p\hat{\Sigma}_k|}}\right) \quad \text{[Equation 1]}$$

Herein, $\Phi_k$, $\mu_k$, and $\Sigma_k$ represent the mixture probability, the mean, and the ratio of variance of a given component k of a Gaussian mixture model, respectively.

Next, the flow of data in the compression network and the estimation network according to an embodiment of the present invention will be described with reference to FIG. 7.

Figure 7:
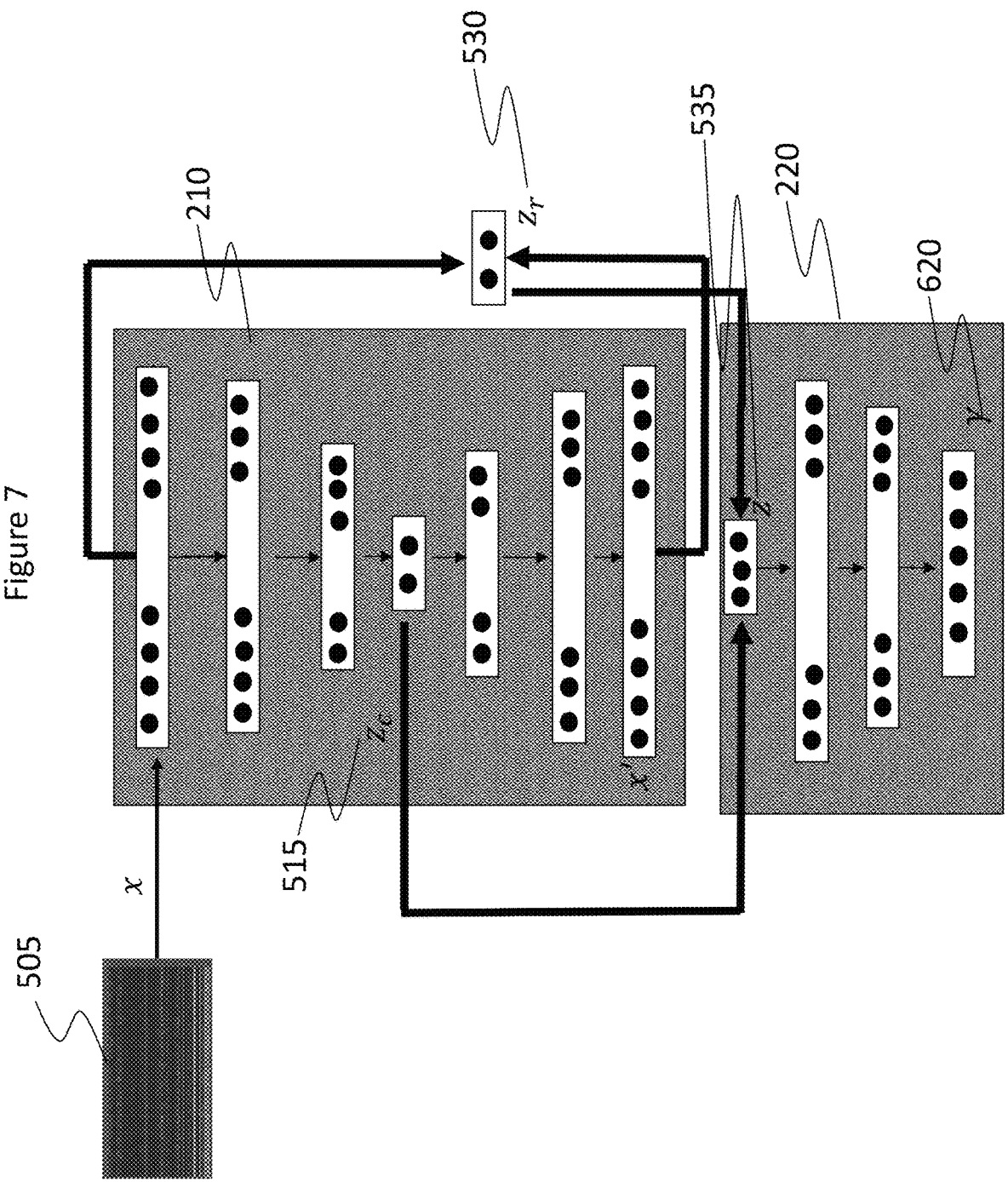
FIG. 7 is a diagram illustrating a flow of data in the compression network and the estimation network according to an embodiment of the present invention.

FIG. 7 is a diagram illustrating the flow of data in the compression network 210 and the estimation network 220 according to an embodiment of the present invention.

As illustrated in FIG. 7, first, a set of subject data 505 (for example, a spectrogram) is input to the compression network 210. The compression network 210 dimensionally compresses the set of subject data 505 in accordance with the dimensionality of the low dimensional representation, which is a compression network hyperparameter, to generate a low dimensional representation 515. A set of reconstructed data is then generated based on the low dimensional representation 515, and the error 530 of the set of reconstructed data is calculated with respect to the set of subject data.

Next, a set of output data 535 that includes the low dimensional representation 515 and the error 530 of the set of reconstructed data with respect to the set of subject data is then input to the estimation network 220. The estimation network 220 uses Equation 1 to calculate the energy spectral density of the set of subject data in accordance with the number of Gaussian distributions, which is an estimation network hyperparameter. By analyzing this energy spectral density, it is possible to determine whether or not the set of subject data is valid in view of the nature of the device to be verified.

Next, an example of a hyperparameter according to an embodiment of the present invention will be described with reference to FIG. 8.

Figure 8:
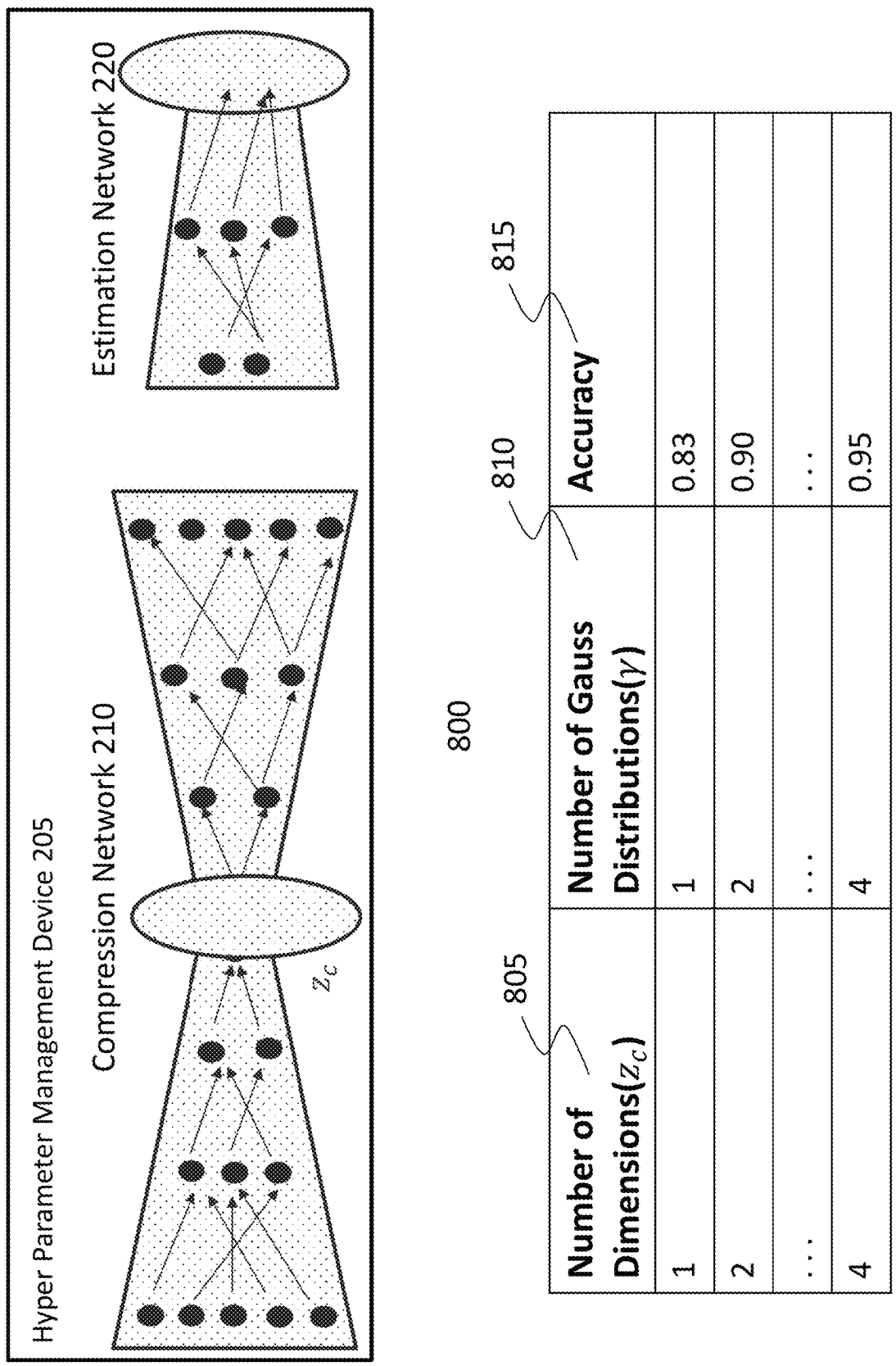
FIG. 8 is a diagram illustrating an example of a hyperparameter according to an embodiment of the present invention.

FIG. 8 is a diagram illustrating an example of a hyperparameter according to an embodiment of the present invention. As described above, the present embodiment relates to optimizing the number of dimensions of the low dimensional representation 805, which is a hyperparameter of the compression network 210, and the number of Gaussian distributions 810, which is a hyperparameter of the estimation network 220. Specifically, the term "optimization" herein means identifying hyperparameters that enable the specificity of a set of subject data to be determined with a predetermined target accuracy.

The table 800 illustrated in FIG. 8 illustrates the correspondence between the low dimensional representation 805, the number of Gaussian distributions 810, and the specificity determination accuracy 815 resulting from these parameters. As illustrated in FIG. 8, in principle, the higher the compression ratio, the lower the number of dimensions of the low dimensional representation, the smaller the required capacity for storing the data, and the fewer the number of Gaussian distributions required to approximate the low dimensional representation, but the specificity determination accuracy 815 decreases (that is, the reliability of the determination as to whether or not the device that generated the set of subject data is abnormal decreases). Accordingly, the present embodiment relates to identifying a hyperparameter that can compress the set of subject data as much as possible and approximate the set of subject data with as few Gaussian distributions as possible while maximizing the determination accuracy 815.

Next, an example of a cluster for identifying an estimation network hyperparameter according to an embodiment of the present invention will be described with reference to FIG. 9.

Figure 9:
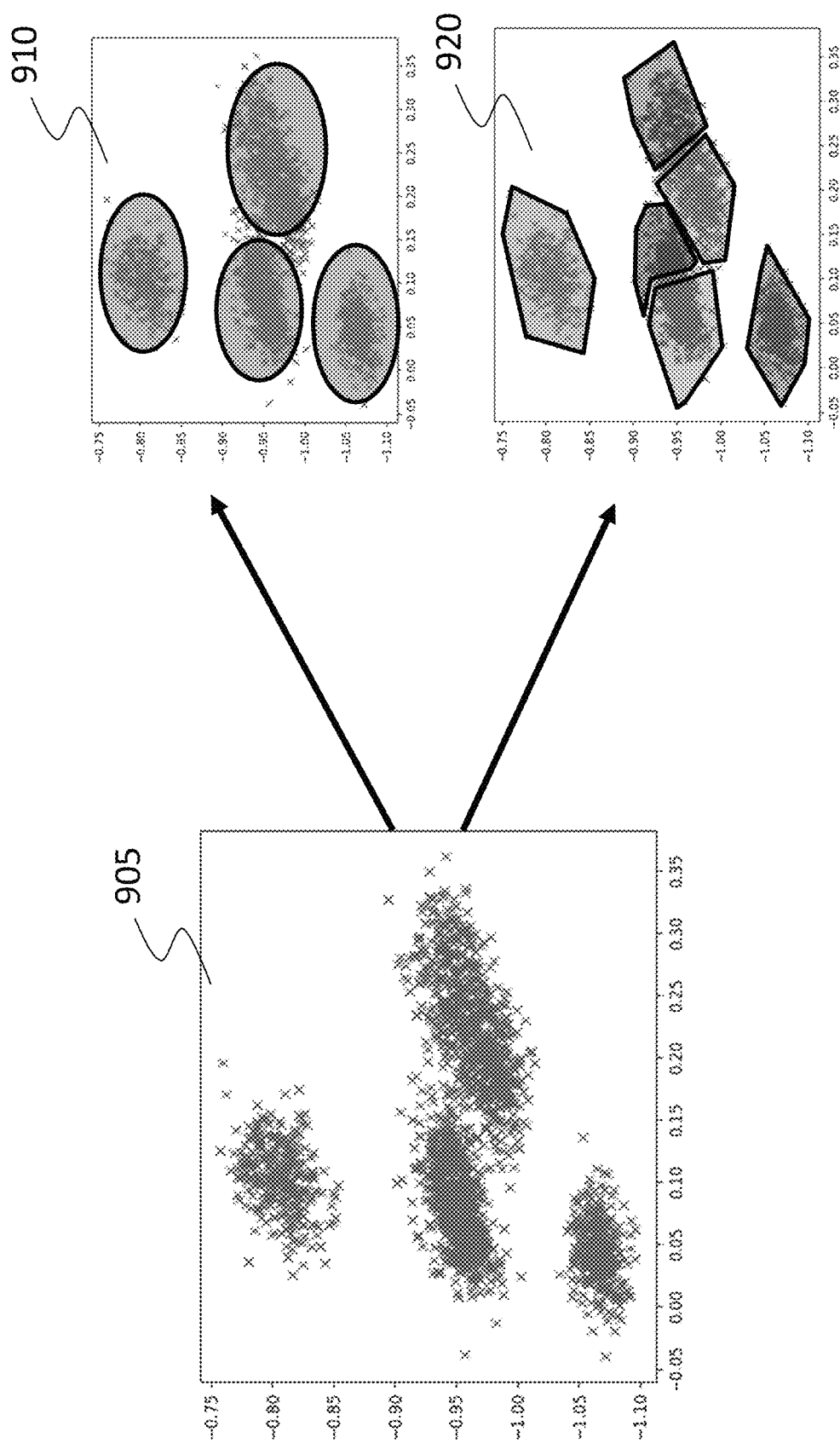
FIG. 9 is a diagram illustrating an example of a cluster for identifying an estimation network hyperparameter according to an embodiment of the present invention.

FIG. 9 is a diagram illustrating an example of a cluster for identifying an estimation network hyperparameter according to an embodiment of the present invention. FIG. 9 includes a graph 905 illustrating a set of subject data, a graph 910 illustrating a result of crude clustering, and a graph 920 illustrating a result of fine clustering.

The graph 905 illustrating the set of subject data may include data collected from one or more devices to be verified. The set of subject data may be, for example, information indicating the volume of the noise collected from cooling fans for a plurality of devices. The group of noise data points collected from each cooling fan is referred to as a "cluster."

In principle, when the density distribution of raw data such as that illustrated in graph 905 is estimated by the estimation network described above, the estimation network approximates one cluster with one Gaussian distribution, such that the number of clusters is equal to the number of Gaussian distributions, which is a hyperparameter of the estimation network. Accordingly, by determining the value of the number of clusters in the set of subject data and setting this value as the hyperparameter of the estimation network, the density distribution of the set of subject data can be estimated more accurately.

However, depending on the set of subject data, it may be difficult to accurately determine the number of clusters, and results with different numbers of clusters may arise depending on the cluster analysis means used. For example, four clusters were identified with the crude cluster analysis technique illustrated in graph 910, while six clusters were identified with the fine cluster analysis technique illustrated in graph 920.

Accordingly, in the present embodiment, in order to determine the accurate number of clusters, a gap statistics calculation method and a curve fitting method, which will be described below, are used.

Next, a gap statistics calculation method according to an embodiment of the present invention will be described with reference to FIG. 10.

Figure 10:
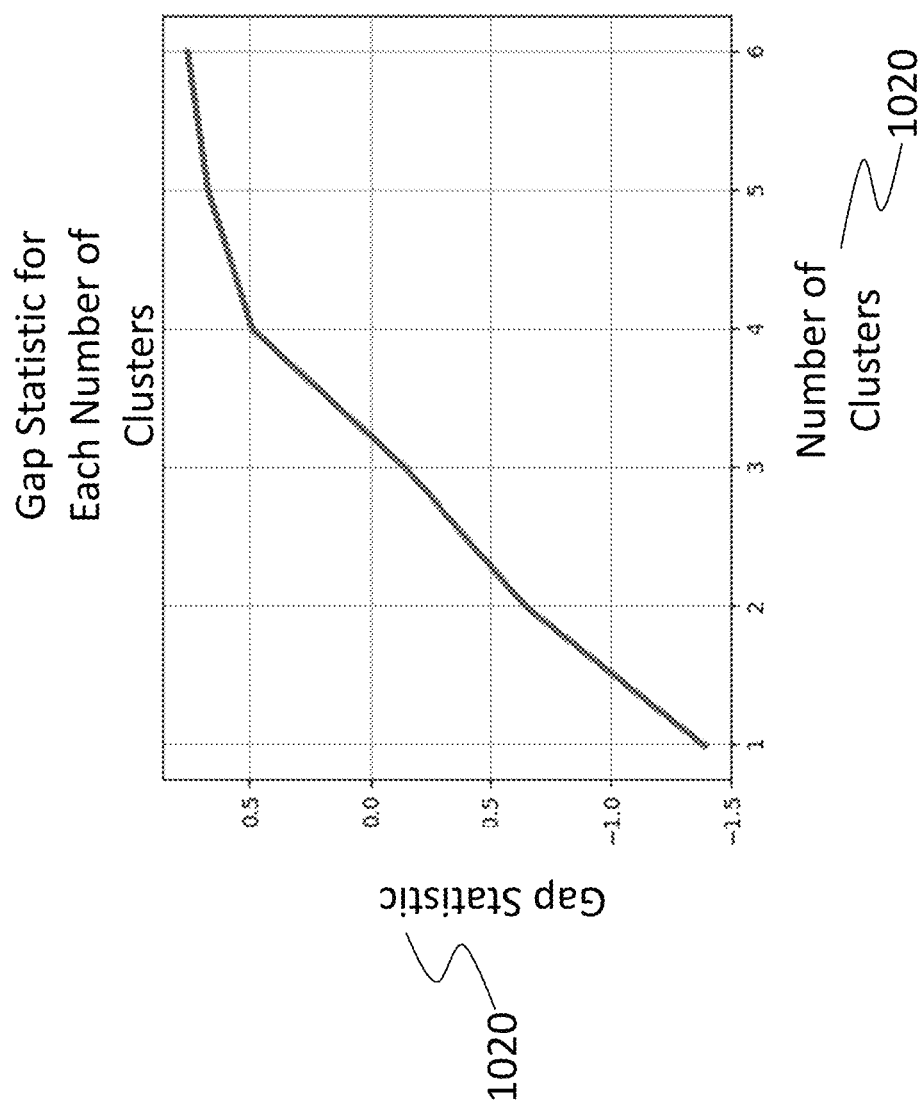
FIG. 10 is a diagram illustrating a gap statistic for each cluster number according to an embodiment of the present invention.

FIG. 10 is a diagram illustrating a gap statistic 1020 for each cluster number 1020 according to an embodiment of the present invention. Here, the gap statistic is a measure that indicates the dispersion between the set of subject data and the set of uniform data that indicates a uniform distribution of the set of subject data. Hereinafter, a method of calculating the gap statistics will be described.

The uniform data here may indicate, for example, a uniform distribution generated over all the observed values with respect to each feature of the set of subject data.

First, the maximum value of the clusters K and the maximum value of the number of times the uniform distribution is extracted $N_r$ are set, and then the initialization conditions are set according to the following Equation 2, Equation 3, and Equation 4.

$$k=1,2 \ldots K \quad \text{[Equation 2]}$$

Here, k is the number of clusters.

$$m=1,2 \ldots N_r \quad \text{[Equation 3]}$$

Here, m is the number of times the uniform distribution is extracted.

$$\text{Ref\_set} \in f(x)=1/(B-A) \text{ for } A \leq x \leq B \quad \text{[Equation 4]}$$

Here, A and B are the lower limit and the upper limit of the set of subject data. As an example, A and B may be, for example, 0 and 1.

Next, Equation 5 is used to calculate the degree of dispersion Dr(m) within a cluster in the uniform distribution.

$$Dr(m)=\Sigma_{r=1}^{k}\Sigma_{i,i' \in C_r}d_{ii'} \quad \text{[Equation 5]}$$

Here, $d_{ii'}$ may be, for example, a square Euclidean distance.

Next, Equation 5 is then used to calculate the degree of variance Do within clusters in the set of subject data.

Finally, using Dr(m) and Do calculated as described above, the gap statistic of the set of subject data and the set of uniform data are calculated using the following Equation 6.

$$G(k) = \log\left(\frac{1}{Nr}\sum_{m=1}^{Nr} Dr_k(m)\right) - \log(Do_k) \quad \text{[Equation 6]}$$

By applying the curve fitting method to the gap statistics for each number of clusters calculated as described above, the number of clusters of a number of sets of subject data, which corresponds to the number of Gaussian distributions and is a hyperparameter of the estimation network, can be identified.

Next, a curve fitting method according to an embodiment of the present invention will be described with reference to FIG. 11.

Figure 11:
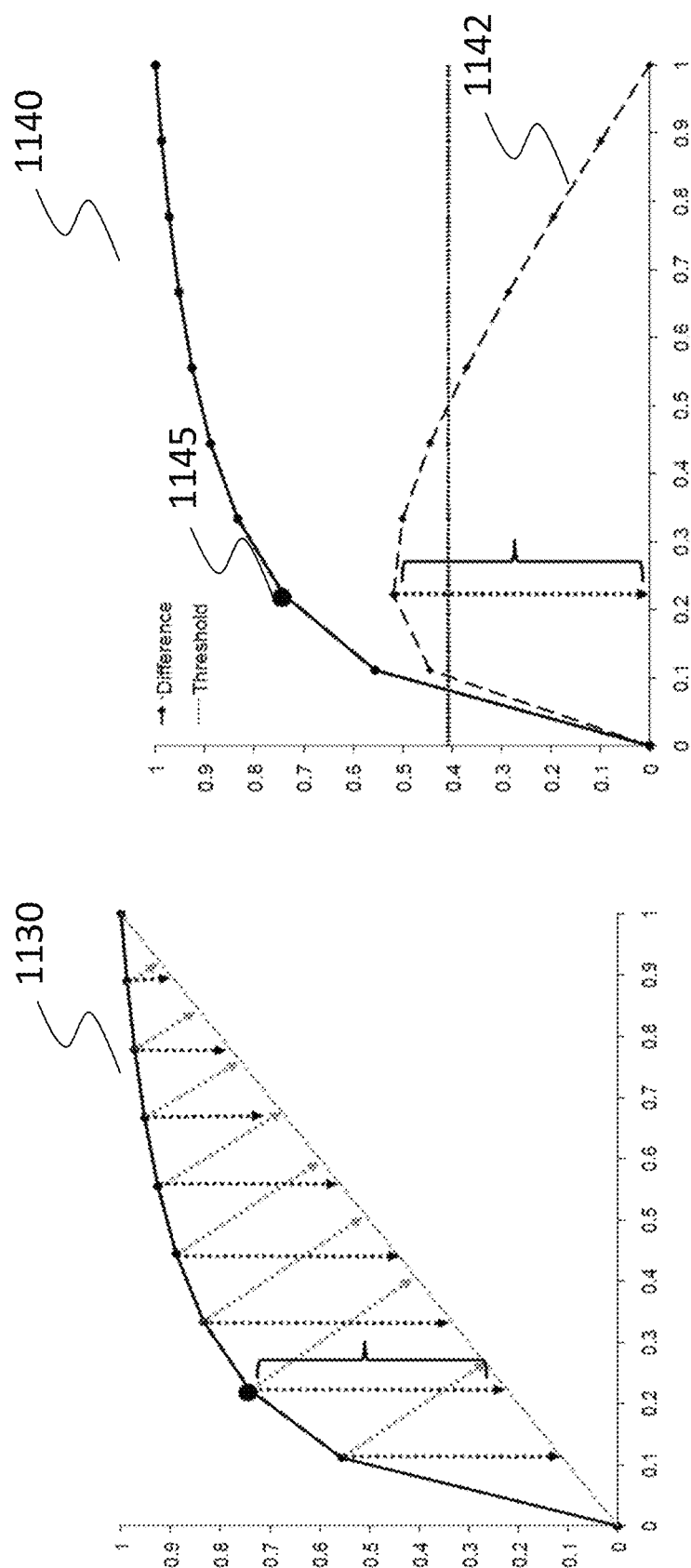
FIG. 11 is a diagram illustrating an example of applying a curve fitting method according to an embodiment of the present invention with respect to a graph illustrating a gap statistic for each of a number of clusters.

FIG. 11 is a diagram illustrating an example of applying a curve fitting method according to an embodiment of the present invention with respect to a graph illustrating a gap statistic for each of a number of clusters (for example, the graph illustrated in FIG. 10). The curve fitting method here is a method for identifying an inflection point in a graph illustrating the gap statistic for each of a number of clusters.

The inflection point corresponds to the correct number of clusters of the set of subject data, and indicates the number of Gaussian distributions, which is the estimation network hyperparameter. Hereinafter, this curve fitting method will be described.

First, a spline curve is applied to a graph that illustrates the gap statistic for each of a number of clusters (for example, the graph illustrated in FIG. 10) that serves as inputs. The spline curve is a smooth curve that passes through a plurality of given control points, and uses an individual polynomial is for each section sandwiched between adjacent points.

Next, the values on the horizontal axis that represent the number of clusters and the values on the vertical axis that represent the gap statistics are normalized by the following Equation 7. The result obtained by normalizing the values on the horizontal axis and the vertical axis is illustrated in the graph 1130 illustrated in FIG. 11.

$$x_{n_i} = \frac{x_i - \min\{x_i\}}{\max\{x_i\} - \min\{x_i\}}; y_{n_i} = \frac{y_i - \min\{y_i\}}{\max\{y_i\} - \min\{y_i\}} \quad \text{[Equation 7]}$$

Next, based on the normalized graph 1130, a difference curve 1142 is calculated by the following Equation 8 (see graph 1140 in FIG. 11):

$$x_{d_i} = x_{n_i}; y_{d_i} = y_{n_i} - x_{n_i} \quad \text{[Equation 8]}$$

Here, $x_{di}$ and $x_{ni}$ are normalized cluster numbers, $y_{ni}$ is a normalized gap statistic, and $y_{di}$ is the difference between $y_{ni}$ and $x_{ni}$.

Next, after calculating the difference curve 1142, the maximum value in graph 1140 is calculated by the following Equation 9.

$$x_{lmx} = x_{d_i}; y_{lmx} = y_{d_i} | y_{d_{i-i}} < y_{d_i}, y_{d_{i+1}} < y_{d_i} \quad \text{[Equation 9]}$$

Here, $x_{lmx}$ is the local maximum of the number of clusters and is the local maximum of the gap statistic.

Next, the threshold $T_{lmx}$ of the local maxima is calculated by the following Equation 10.

$$T_{lmx} = y_{lmx} - \frac{\sum_{i=1}^{n-1}(x_{n_{i+1}} - x_{n_i})}{n-1} \quad \text{[Equation 10]}$$

If there is a difference value (for example, $x_{dj}$, $y_{dj}$ (j>i)) below the threshold value $T_{lmx}$ of Equation 10, then $x_{lmx}$, which is the value of this difference value on the horizontal axis, is identified as an inflection point 1145 of the curve. As described above, this inflection point 1145 corresponds to the correct number of clusters of the set of subject data, and is a value that indicates the number of Gaussian distributions, which is a hyperparameter of the estimation network.

Next, with reference to FIG. 12, a graph illustrating an estimation network hyperparameter according to an embodiment of the present invention will be described.

Figure 12:
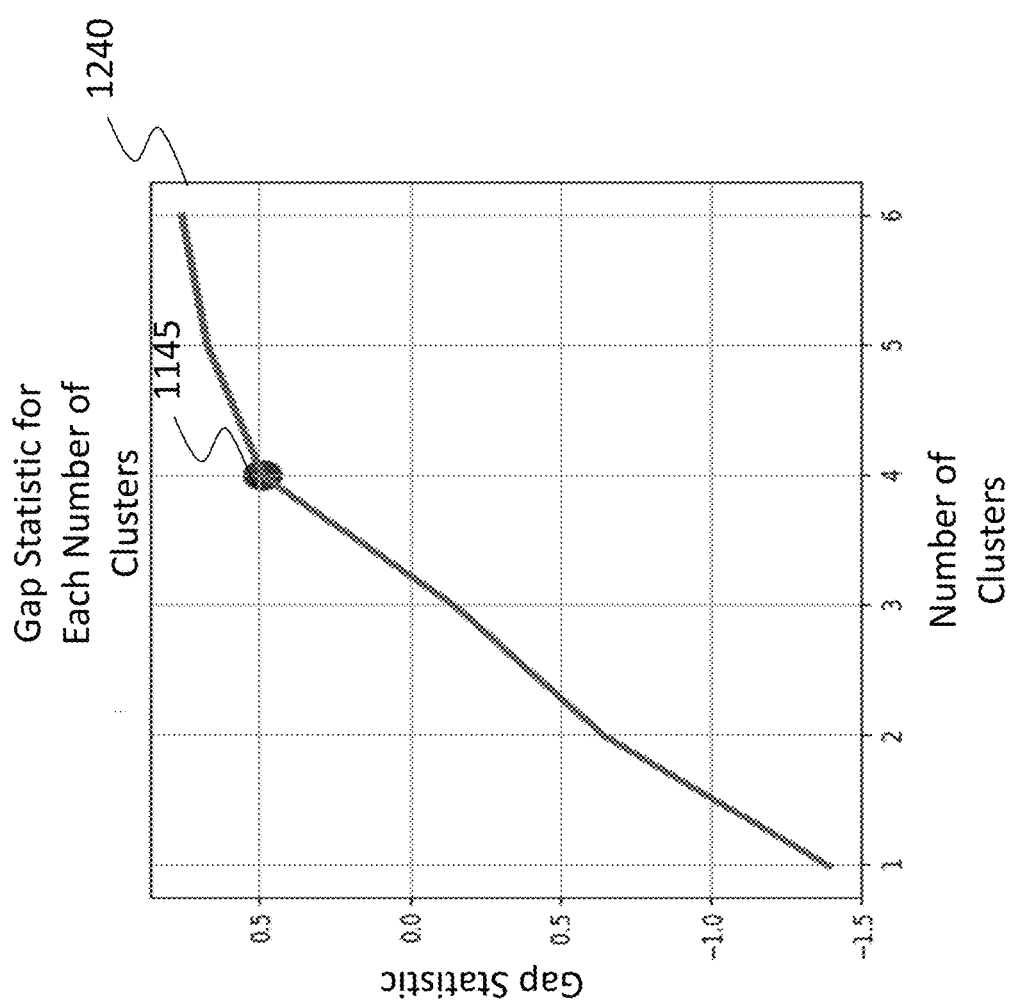
FIG. 12 is a graph for identifying estimation network hyperparameters according to an embodiment of the present invention.

FIG. 12 illustrates a graph 1240 for identifying an estimation network hyperparameter 1145 according to an embodiment of the present invention. This graph 1240 illustrates the result of applying the gap statistic calculation method and the curve fitting method described above to the graph illustrated in FIG. 10, and is obtained by denormalizing the graph 1140 illustrated in FIG. 11.

As described above, the value on the horizontal axis of the inflection point 1145 of the graph 1240 corresponds to the correct number of clusters of the set of subject data, and is a value that indicates the number of Gaussian distributions, which is a hyperparameter of the estimation network. For example, in the case of the graph 1240, the number of Gaussian distributions, which is an estimation network hyperparameter, is "4." Accordingly, by setting the number of Gaussian distributions used by the estimation network to "4" and identifying the compression network hyperparameter by the means described later and setting it in the compression network, it is possible to improve the accuracy of determining the specificity of the set of subject data and provide a machine learning model that can be applied to fields such as abnormality detection and predictive maintenance.

Next, referring to FIG. 13, a description will be given of a means for identifying a compression network hyperparameter according to an embodiment of the present invention.

Figure 13:
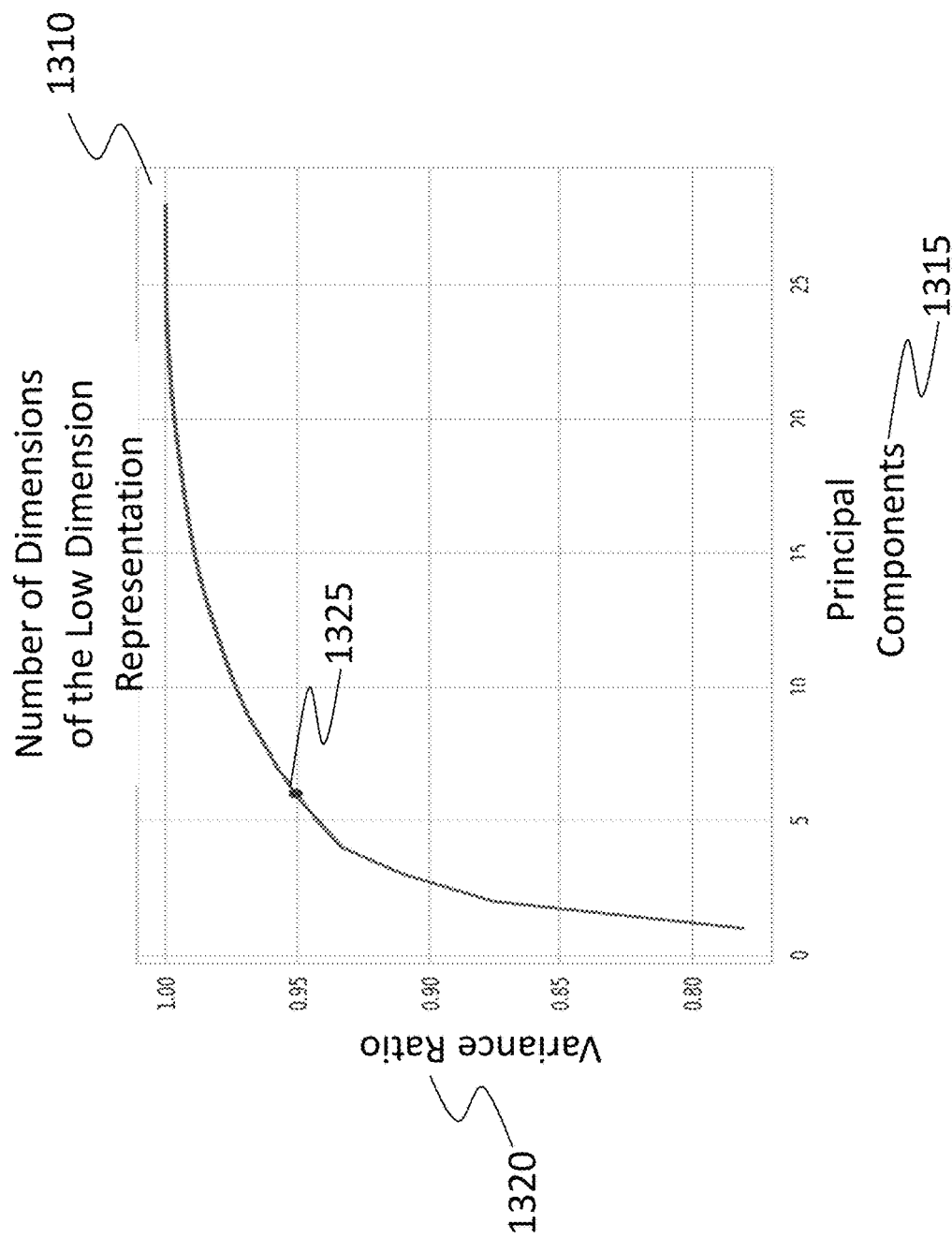
FIG. 13 is a graph for identifying compression network hyperparameters according to an embodiment of the present invention.

FIG. 13 illustrates a graph 1310 for identifying a compression network hyperparameter according to an embodiment of the present invention. As illustrated in FIG. 13, the horizontal axis of the graph 1310 indicates the principal components 1315 of the set of subject data obtained by what is known as principal component analysis, and the vertical axis of the graph 1310 indicates the ratio of variance 1320 of the set of subject data obtained by what is known as variance analysis.

Principal component analysis is a multivariate analysis method that synthesizes a large number of correlated variables into a smaller number of uncorrelated variables, called principal components, which best represent the entire variation. Here, the principal components correspond to the number of dimensions of the low dimensional representation produced by the compression network. In addition, the ratio of variance here is expressed by F=u2/v2, where u2 and v2 are the variances of the samples extracted from two different sets of populations, respectively, and the ratio of both of these is taken. If the value of F is very large or close to zero, it can be assumed that both were not extracted from the same population.

By applying the principal component analysis and the variance analysis to the set of subject data, a graph indicating the ratio of variance for each principal component of the set of subject data, such as the graph 1310 of FIG. 13, can be generated.

It should be noted that, since the variance analysis and principal component analysis are calculated by generally known means, a detailed description thereof is omitted here.

The inflection point 1325 of the graph 1310 can be identified by applying the above-described curve fitting method to the graph 1310 indicating the ratio of variance of each principal component of the set of subject data. The value on the horizontal axis of the inflection point 1325 is the number of appropriate principal components for representing the set of subject data, and is a value indicating the number of dimensions of the low dimensional representation, which is a hyperparameter of the compression network. For example, in the case of the graph 1310 illustrated in FIG. 13, since the number of principal components is "6," the number of dimensions of the low dimensional representation, which is a hyperparameter of the compression network, is also "6."

As described above, by setting the hyperparameter of the compression network identified here and the hyperparameter of the estimation network identified by the gap statistics calculation and the curve fitting method to each of the compression network and the estimation network, respectively, the specificity of the set of subject data can be determined with high accuracy.

Next, with reference to FIG. 14, the result of setting the hyperparameters identified by the calculation means according to the embodiments of the present invention in the compression network and the estimation network will be described.

Figure 14:
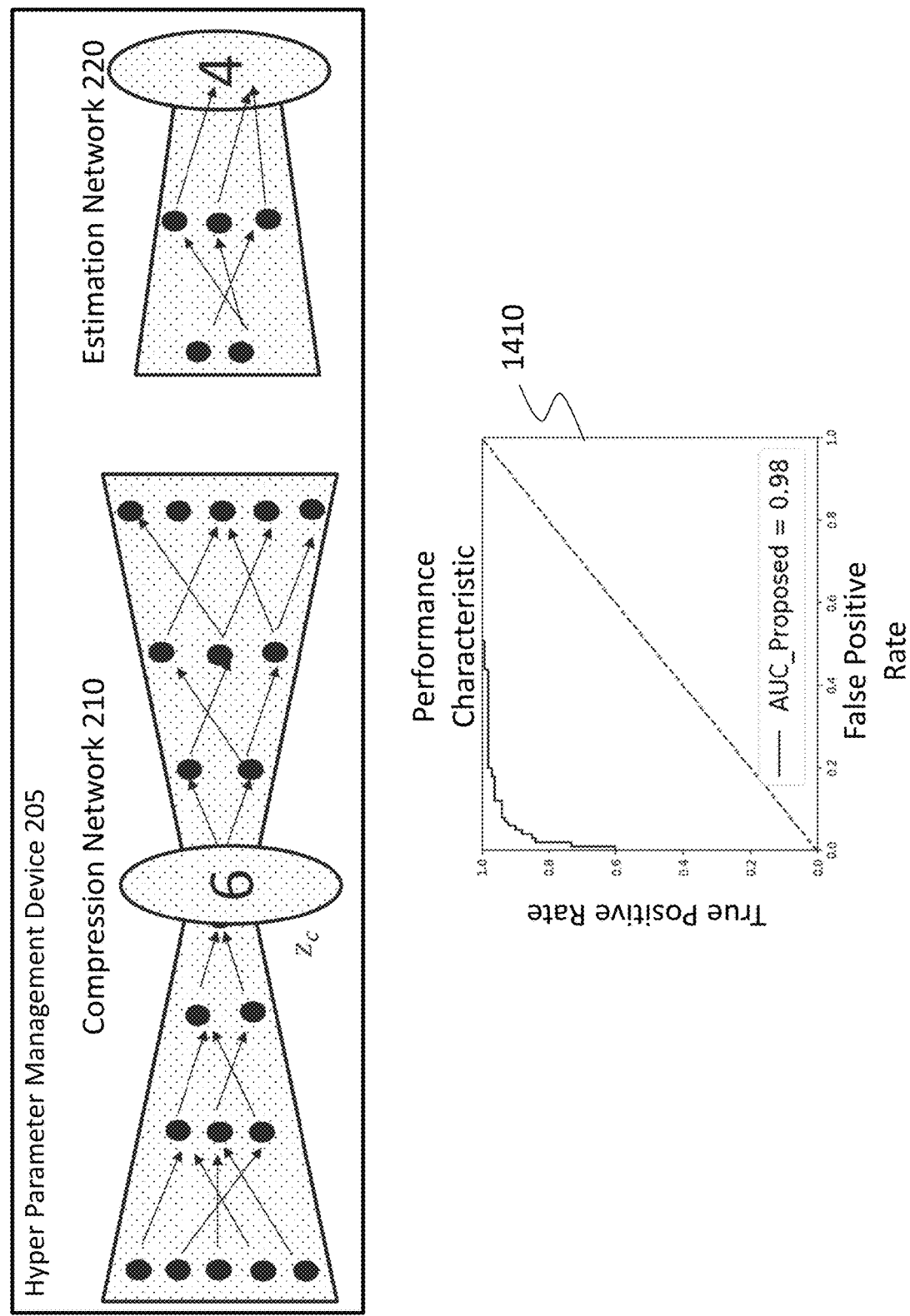
FIG. 14 is a diagram illustrating a result of setting the hyperparameters identified by the calculating means according to an embodiment of the present invention to the compression network and the estimation network.

FIG. 14 is a diagram illustrating a result of setting the hyperparameters specified by the calculation means according to the embodiments of the present invention in the compression network 210 and the estimation network 220.

After the hyperparameters have been identified by the above-described calculation methods, the hyperparameter management device 205 can determine the specificity of the set of subject data with high accuracy by setting the hyperparameters in the corresponding networks.

For example, when it is specified that the number of dimensions of the low dimensional representation identified in the above-described example is "6" and the number of Gaussian distributions is "4", the hyperparameter of the compression network 210 is set to "6," and the hyperparameter of the estimation network 220 is set to "4."

The graph 1410 illustrated in FIG. 14 shows the performance characteristics of the hyperparameter management device 205 when the hyperparameters of the compression network 210 and the estimation network 220 are set to those hyperparameters identified by the above-described calculation methods. These performance characteristics may be represented by, for example, a relationship between the true positive rate with which it is correctly determined that the set of subject data is abnormal and the false positive rate with which it is erroneously determined that the set of subject data is abnormal. For example, in this case, the hyperparameter management device 205 can correctly determine the set of subject with 98% accuracy.

Next, with reference to FIG. 15, a surface plot of the accuracy resulting from the hyperparameters according to an embodiment of the present invention will be described.

Figure 15:
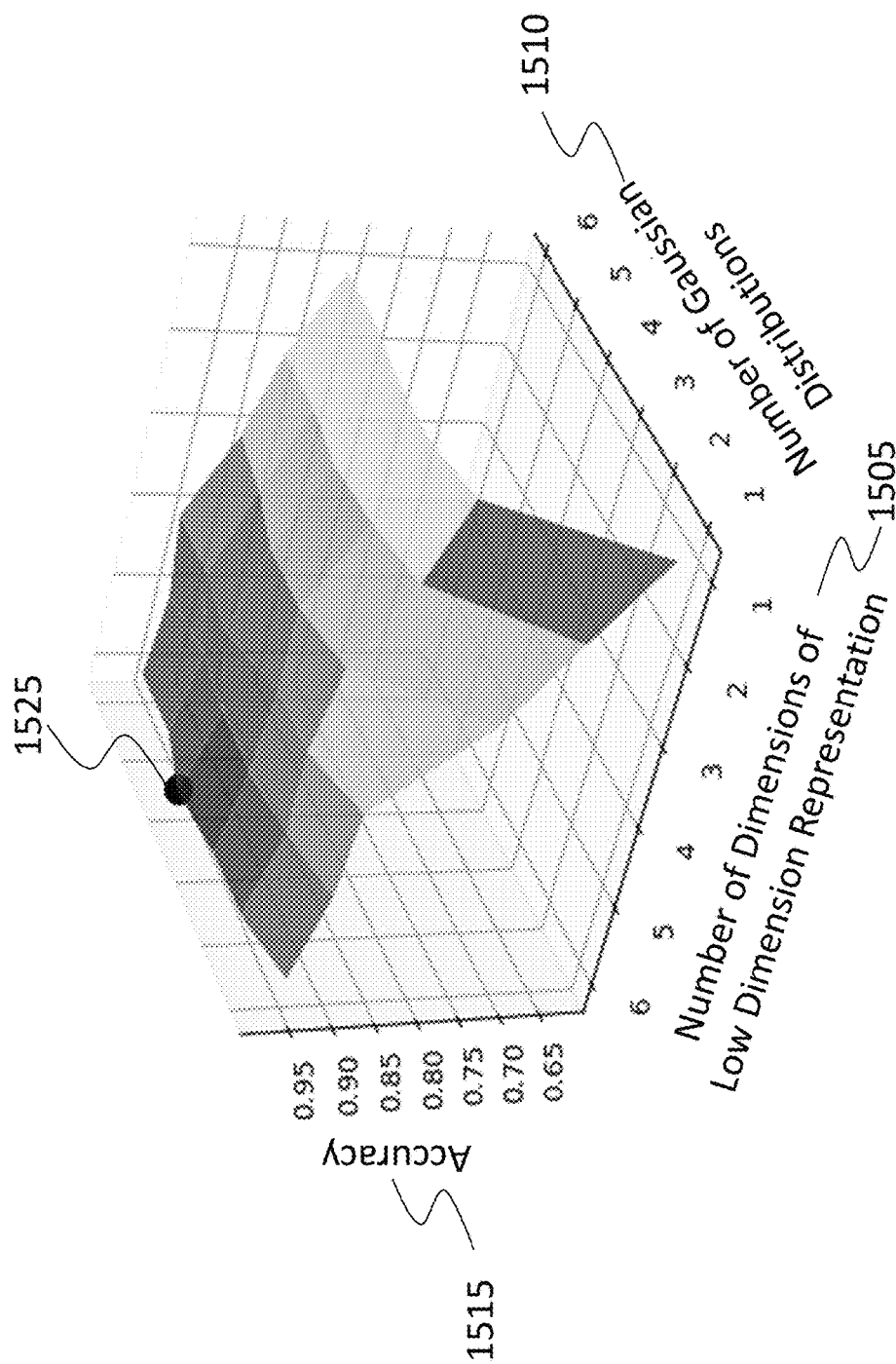
FIG. 15 illustrates a surface plot of the accuracy resulting from the hyperparameters according to an embodiment of the present invention.

FIG. 15 illustrates a surface plot 1500 of the accuracy resulting from the hyperparameters according to an embodiment of the present invention. The surface plot 1500 illustrates the correspondence between the number of the low dimensional representations 1505, the number of Gaussian distributions, and the accuracy 1515 of determining the specificity of the set of subject data.

When a machine learning model is used in which the value of the number of dimensions of the low dimensional representation and the value of the number of Gaussian distributions identified by the above-described calculation means are set, the specificity of the set of subject data can be determined with a higher determination accuracy than with other hyperparameters.

For example, as illustrated in the surface plot 1500 of FIG. 15, when the value of the number of Gaussian distributions 1510 is set to "4" and the value of the number of dimensions of the low dimensional representation 1505 is set to "6," the value 1525 of the determination accuracy 1515 is maximized. In this manner, by identifying the hyperparameter of the compression network and the hyperparameter of the estimation network by the above-described calculation means, it is possible to compress the set of subject data as much as possible while maximizing the determination accuracy 1515, and to approximate the set of subject data with as few Gaussian distributions as possible.

Next, an example of a configuration for independently training the estimation network and the compression network according to an embodiment of the present invention will be described with reference to FIG. 16.

FIG. 16 illustrates an example configuration 1600 for independently training the estimation network and the compression network according to an embodiment of the present invention.

In the above description, the processing for identifying the estimation network hyperparameter and the compression network hyperparameter are executed in parallel, but the present invention is not limited to this, and a configuration for independently identifying the estimation network hyperparameter and the compression network hyperparameter is also possible.

As illustrated in FIG. 16, the configuration 1600 includes a device 410 which serves as the source of subject data to be analyzed, and a hyperparameter management device 205.

Since the configuration 1600 is substantially the same as the test environment 400 described with reference to FIG. 4, the same reference numerals are assigned to the same components, and the description thereof is omitted.

In configuration 1600, a set of subject data 415 collected from the device 410 is converted to a spectrogram 420 (for example, a Log-Mel Spectrogram) that is decodable by the hyperparameter management device 205, and subsequently this spectrogram 420 is input to the compression network 210. At this stage, since the compression network 210 is still untrained and the optimal compression network hyperparameter has not been set, a low dimensional representation with an arbitrary number of dimensions is generated.

A set of output data 535 ($z$), which includes the low dimensional representation and the error of the set of reconstructed data with respect to the set of subject data, is transmitted to the estimation network 220. Subsequently, based on this output data 535, the gap statistics calculation means and the curve fitting means described above are used to identify the number of Gaussian distributions, which is the number of dimensions of the low dimensional representation, which is a hyperparameter of the estimation network.

The estimation network 220 estimates the density distribution of the output data 535 based on the number of Gaussian distributions identified. Subsequently, this density distribution and the hyperparameters used in the estimation network 220 are then transmitted to the compression network 210. Based on this information, the compression network 210 uses the variance analysis and curve fitting techniques described above to determine the appropriate number of dimensions of the low dimensional representation and sets it as a hyperparameter.

In this way, since the respective hyperparameters are continuously identified one by one, it is possible to realize a machine learning model configuration with higher flexibility. This process may be repeated until a predetermined determination accuracy is achieved.

Although the embodiments of the present invention have been described above, the present invention is not limited to the above-described embodiments, and various modifications can be made within a scope that does not depart from the gist of the present invention.

REFERENCE SIGNS LIST

205 Hyperparameter management system
207 Communication unit

208 Set of subject data
210 Compression network
220 Estimation network
230 Hyperparameter calculation unit

The invention claimed is:

1. A hyperparameter management device comprising:
a compression network configured to dimensionally compress data to produce a low dimensional representation;
an estimation network configured to estimate a density distribution of the low dimensional representation; and
a hyperparameter calculation unit configured to calculate hyperparameters for the compression network and the estimation network,
wherein the hyperparameter calculation unit is implemented by a processor that is configured to:
calculate, based on a set of subject data and a set of uniform data, a gap statistic using a gap statistic calculation technique, and calculate, using a curve fitting technique, an estimation network hyperparameter based on at least the gap statistic,
calculate a ratio of variance of principal components of the set of subject data, and calculate, using a curve fitting technique, a compression network hyperparameter based on at least the ratio of variance, and
set the estimation network hyperparameter in the estimation network and set the compression network hyperparameter in the compression network.

2. The hyperparameter management device according to claim 1, wherein:
the hyperparameter management device further comprises a determination unit implemented by a processor that is configured to determine a specificity of data;
the compression network is configured to:
dimensionally compress the set of subject data, generate a subject data low dimensional representation that corresponds to the set of subject data, and generate a set of reconstructed data based on the subject data low dimensional representation,
calculate, based on the set of reconstructed data and the set of subject data, an error of the set of reconstructed data with respect to the set of subject data;
the estimation network is configured to:
estimate, based on the subject data low dimensional representation and the error, a density distribution of the set of subject data; and
the determination unit is configured to:
determine a specificity of the set of subject data based on the density distribution.

3. The hyperparameter management device according to claim 1, wherein:
the estimation network hyperparameter indicates a number of Gaussian distributions required to approximate the set of subject data.

4. The hyperparameter management device according to claim 1, wherein:
the compression network hyperparameter indicates a number of dimensions of the low dimensional representation.

5. A hyperparameter management system comprising:
a hyperparameter management server; and
a client terminal,
wherein:
the hyperparameter management server and the client terminal are connected via a communication network,
the hyperparameter management server includes:
a compression network configured to dimensionally compress data to produce a low dimensional representation,
an estimation network configured to estimate a density distribution of the low dimensional representation,
a hyperparameter calculation unit configured to calculate hyperparameters for the compression network and the estimation network, and
a determination unit implemented by a processor that is configured to determine a specificity of data;
and in a case that subject data to be analyzed is received from the client terminal,
the hyperparameter calculation unit is implemented by a processor that is configured to:
calculate, based on a set of subject data and a set of uniform data, a gap statistic using a gap statistic calculation technique, and calculate, using a curve fitting technique, an estimation network hyperparameter based on at least the gap statistic,
calculate a ratio of variance of principal components of the set of subject data, and calculate, using a curve fitting technique, a compression network hyperparameter based on at least the ratio of variance, and
set the estimation network hyperparameter in the estimation network and set the compression network hyperparameter in the compression network;
the compression network is configured to:
dimensionally compress the set of subject data, generate a subject data low dimensional representation that corresponds to the set of subject data, and generate a set of reconstructed data based on the subject data low dimensional representation, and
calculate, based on the set of reconstructed data and the set of subject data, an error of the set of reconstructed data with respect to the set of subject data;
the estimation network is configured to:
estimate, based on the subject data low dimensional representation and the error, a density distribution of the set of subject data; and
the determination unit is configured to:
determine a specificity of the set of subject data based on the density distribution and provide notification of a result of this determination to the client.

6. A hyperparameter management method executed by a hyperparameter management device,
the hyperparameter management device comprising:
a compression network configured to dimensionally compress data to produce a low dimensional representation;
an estimation network configured to estimate a density distribution of the low dimensional representation; and
a hyperparameter calculation unit implemented by a processor that is configured to calculate hyperparameters for the compression network and the estimation network,
wherein the hyperparameter management method includes:
a step of calculating, based on a set of subject data and a set of uniform data, a gap statistic using a gap statistic calculation technique, and calculating, using a curve fitting technique, an estimation network hyperparameter based on at least the gap statistic,
a step of calculating a ratio of variance of principal components of the set of subject data, and calculating, using a curve fitting technique, a compression network hyperparameter based on at least the ratio of variance, and
a step of setting the estimation network hyperparameter in the estimation network and setting the compression network hyperparameter in the compression network.

* * * * *